Patented Oct. 17, 1933

1,930,530

UNITED STATES PATENT OFFICE 1,930,530

WELDING ELECTRODE

David L. Mathias, Pittsburgh, Pa., assignor to Westinghouse Electric & Manufacturing Company, a corporation of Pennsylvania No Drawing. Application April 2, 1931
Serial No. 527,349

8 Claims. (Cl. 219—8)

My invention relates to welding electrodes and more particularly to low-carbon steel electrodes containing a substantial quantity of hydrogen.

The principal object of my invention is to provide an electrode containing a substantial amount of occluded hydrogen which is adapted to be employed as a positive electrode in a direct-current electric-arc welding operation.

Another object of my invention is to provide a welding electrode which is first subjected to a hardening operation and then treated with a mineral acid which is capable of evolving free hydrogen in the presence of the electrode, the hardened electrode being capable of retaining the hydrogen for a comparatively long period of time.

A further object of my invention is to provide a process for the production of low-carbon-steel electrodes containing a substantial amount of occluded hydrogen which comprises pickling a rod or electrode in acid to remove scale, washing it to remove acid, dipping it in an alkaline solution, drawing it through suitable dies, and again pickling it in acid, thereby increasing the hydrogen-retaining properties of the hardened rod.

In producing positive low carbon steel electrodes for direct-current electric-arc welding operations, it has heretofore been the practice to provide such electrodes with a liquor-bright finish. According to this method, an electrode was drawn through, or dipped in, a solution of copper sulphate or a mixture of copper and tin sulphates, thus providing an electrode with a plating which served as a lubricant during a subsequent drawing operation and protected the electrode or rod against corrosion. Electrodes produced in this manner have fairly satisfactory characteristics when utilized as positive electrodes under conditions of reversed polarity. Prior investigators in this field, however, attributed the desirable characteristics of such electrodes to the absence of lime or other calcium compounds.

I have made the discovery that if a low-carbon steel electrode which is cleaned by a pickling operation is first hardened by a suitable hardening process, such as by drawing it through suitable dies, is again pickled in acid, a substantial amount of hydrogen will be occluded and remain within the electrode for an indefinite period of time.

My research upon this subject definitely shows that the melting rate of a low carbon steel electrode, when employed as the positive electrode in a direct-current arc welding operation, is regulated by the amount of hydrogen within the electrode rather than by the absence of lime or other calcium compound and, since the hardening operation enables the retention of a large amount of hydrogen, my improved electrode has a faster melting rate and better operating characteristics than previous electrodes of this type.

My improved electrode comprises a ferrous-base metal of low-carbon content, say not more than .35% carbon, by weight, which contains a substantial amount of occluded hydrogen. Electrodes may be produced by my improved process having a lime, liquor-bright "mill finish" or sul-coat finish or coated with a flux. The principal steps of my improved process, however, are the same for the production of all types of electrodes and may be briefly stated as follows. Rods, or electrodes, which have been pickled and treated with a suitable lubricant, are drawn through suitable wire-drawing dies to reduce their diameters and harden the metal of which they are composed. After this treatment, the rods are placed in an acid bath of sufficient strength and for a sufficient length of time to allow a substantial amount of hydrogen to be occluded within them. Thus treated, the rods may be subsequently subjected to any desired finishing operation or provided with flux-coating without losing their occluded hydrogen.

In practicing my invention, I prepare a suitable pickling bath containing about $2\frac{1}{2}\%$ to 20%, by volume, of a strongly active acid, such as sulphuric, hydrochloric, or nitric acid. I prefer to utilize sulphuric acid having a specific gravity of approximately 1.85. This acid bath should contain about .1% to .2%, by weight, of a chemical inhibitor, such as the alpha-amino fatty acids, anthracene, thiourea, pyridene, quinolene or naphthalene, or any other chemical compound which is capable of preventing the acid from attacking the steel after the scale or surface coating has been removed.

The rods, or electrodes, are placed in a pickling bath, for a period of from about 5 minutes to about one hour and are then removed and washed with water or other suitable solvent to remove the acid. To neutralize traces of acid remaining on the rods and to serve as a carrier for a lubricant, the rods are dipped in an alkaline solution, such as an aqueous solution or a partial solution and suspension of lime. The lime-coated rods after being passed through a lubricant, such as soap or petroleum grease, are immediately passed through suitable wire-drawing dies which serve to harden the rods. As the rods are drawn, through the dies, a large proportion of the lime and lubricant is removed and the remainder is either removed or neutralized and the salt removed by a second pickling operation to be hereinafter described.

After the rods have been hardened, they are again placed in an acid bath which may be of similar concentration to that utilized in the first pickling operation for a period of from 2½ minutes to about 2 hours, while the acid is maintained at temperatures varying from room temperature to that of the boiling point of the acid.

When the acid comes in contact with the electrode, hydrogen is evolved which penetrates into the electrode, and, since the rod has been hardened by a suitable treatment, it will retain the hydrogen for an indefinite period of time.

The subsequent treatment of the hardened rods containing occluded hydrogen will, in general, depend upon the particular kind of finish that may be desired.

A rust or suitcoat finish may be obtained by removing the rods from the acid bath and permitting the acid to gradually dry on the surfaces of the rods. A plain wire may be produced by washing the rods with water after removal from the pickling bath and allowing them to dry in air, or, if it is desired to obtain a lime finish wire and insure the complete removal of all traces of acid, the rods may be dipped in a very weak lime bath of sufficient strength to merely neutralize the acid and then allowed to dry. However, a slight amount of either iron salt, iron oxide, or alkali upon the surface of the rod will not materially affect its welding characteristics. I have found, however, that it is preferable to have a slight excess of oxide or salt rather than a slight excess of lime present on the rod, because lime retards the melting rate to a limited extent when the rod is employed as the positive electrode in a direct-current welding operation.

Rods produced in the previously described manner may be coated with a flux when it is desired to obtain a very stable arc and to modify the physical or welding characteristics of the electrode. I have found that such fluxes as ferric oxide, titanium oxide, calcium carbonate, aluminum oxide or silicon dioxide, or mixtures of two or more of such fluxes, may be applied to the rods by any well known method, utilizing sodium silicate solution or other adhesives as a binding agent. The proportion of flux coating to the total weight of the rod may vary between .01 of 1% to 60% or 70%. In general, fairly light flux coatings are desirable for electrodes having a high melting rate and a maximum degree of penetration in the work metal, while the heavier flux coatings may be utilized where speed in welding is not as highly essential and when it is desired to regulate the chemical composition and the physical characteristics of the arc-deposited metal.

By means of a slight modification of my method, wires having a liquor-bright finish may be produced. According to this method, hot-rolled rods are pickled in an acid bath containing an inhibitor, such as those previously mentioned, to remove scale. They are then coated with lime and a lubricant, baked to eliminate occluded gas, and drawn through dies until the diameter is reduced to within one draft of the finished size, in the previously described manner. After this preliminary treatment, the rods are pickled in an acid bath, plated in a solution of copper and tin sulphates, coated with a lubricant such as a fermented liquor or rye meal and yeast, and again passed through wire-drawing dies to form the finished wire. The second pickling operation referred to above removes the lime and grease from the wire for the plating operation and, at the same time, causes a substantial amount of hydrogen to be occluded within the wire.

The following specific example will serve to illustrate and explain my invention. A wire having a diameter of $\frac{5}{32}$ inch and a carbon content of about .13% by weight, was prepared according to my improved method and pickled for about 30 minutes in an acid bath comprising 10% sulphuric acid, by volume, at a temperature of 190° F. to 200° F. The wire, thus prepared, when utilized as the positive electrode in an arc welding operation under reversed polarity, at a current value of 150 to 160 amperes had a melting rate of approximately 40 to 60 grams per minute. A similar wire which had not been subjected to a hardening operation before pickling had a melting rate of 22 to 25 grams per minute. The high melting rate, under conditions of reversed polarity, of a wire of this kind may be attributed to the hydrogen content and varies with the amount of hydrogen present in the wire.

Where the term "occluded" hydrogen has been employed in the specification and claims, it will be understood that it includes hydrogen present in any form in the welding rod or electrode, including hydrogen present in combined form.

By utilizing electrodes produced by my improved method, under conditions of reversed polarity in a direct-current welding operation, a steady, concentrated arc may be formed which will not sputter or whirl and may be easily controlled and manipulated by a welding operator. Furthermore, because of the freedom from porosity of the arc-deposited metal and the absence of pin holes in the metal deposited by my improved electrode, it is particularly suited to the manufacture of pressure vessels, tanks, boilers and pipe lines.

While I have disclosed my invention in considerable detail, and have given specific examples, it will be understood that the examples are to be construed as illustrative and not by way of limitation. For example, while I have mentioned a wire drawing operation for hardening the alloy before the second annealing operation, it will be understood that the electrode may be hardened by heating the rods or electrodes above the critical transformation point and then cooling rapidly. I prefer, however, to utilize the drawing process because it is effective and more economical.

Other modifications will become apparent to those skilled in the art without departing from the spirit and scope of my invention. It is, therefore, desired that only such limitations shall be imposed as are indicated in the appended claims.

I claim as my invention:

1. The process of producing electrodes containing occluded hydrogen which comprises pickling the electrodes in an acid bath containing a chemical inhibitor, removing the acid, coating with a lubricant, drawing through dies to harden the electrode, and again pickling in an acid bath, the second acid bath being of sufficient strength and said pickling operation extending for a sufficient length of time to cause a substantial amount of hydrogen to be occluded within the rods, and then washing the rods with water to remove the acid.

2. In the process of producing an electrode containing occluded hydrogen, the step which comprises pickling a hardened rod or electrode in an acid bath.

3. In the process of producing an electrode containing occluded hydrogen, the steps which comprise drawing a lubricant coated rod or electrode through suitable dies, and then immersing said rod or electrode in an acid bath.

4. In the process of producing an electrode containing occluded hydrogen, the steps which comprise drawing a lime-coated electrode through suitable dies, immersing it in an acid bath, removing the electrode from the acid bath and neutralizing the acid remaining on the electrode.

5. In the process of producing an electrode containing occluded hydrogen, the steps which comprise drawing a lime-coated electrode through suitable dies to harden the electrode, immersing it in an acid bath, removing the electrode from the acid bath and allowing it to dry to form an electrode having a rusted surface.

6. In the process of producing a low-carbon steel electrode containing occluded hydrogen, the steps which comprise drawing a lime-and-lubricant-coated steel electrode through suitable dies, subjecting it to an acid bath treatment and then removing it from the acid bath and washing it with water to remove the acid.

7. The process of producing a low-carbon steel electrode containing occluded hydrogen which comprises pickling a rod or electrode in an acid bath containing a chemical inhibitor, washing it in a solvent for the acid, coating it with a lubricant, drawing it through dies, and then pickling it in an acid bath for a sufficient length of time to allow a substantial amount of hydrogen to be occluded within it and finally removing the rod from the acid bath and allowing it to dry in air.

8. The process of producing a low-carbon steel electrode containing occluded hydrogen which comprises pickling a rod or electrodes in an acid bath containing a chemical inhibitor, coating it with lime, baking it at an elevated temperature, drawing it through dies, pickling it in an acid bath, and finally subjecting it to a wire-drawing operation.

DAVID L. MATHIAS.